Figure 1:
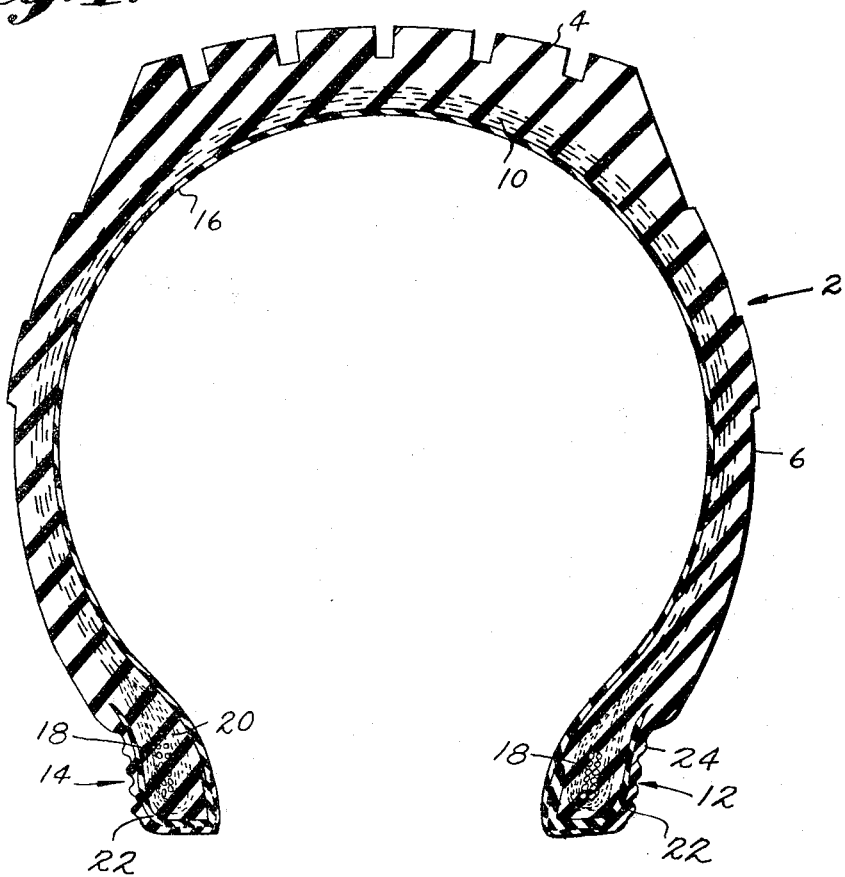

Nov. 1, 1966 — E. C. ATWELL — 3,282,724
TIRE FABRIC AND METHOD OF MAKING SAME
Filed April 18, 1963

INVENTOR.
EVERETT C. ATWELL
BY
Cushman, Darby & Cushman
ATTORNEYS

United States Patent Office 3,282,724
Patented Nov. 1, 1966

3,282,724
TIRE FABRIC AND METHOD OF MAKING SAME
Everett C. Atwell, Greensboro, N.C., assignor to Burlington Industries, Inc., Greensboro, N.C., a corporation of Delaware
Filed Apr. 18, 1963, Ser. No. 273,865
12 Claims. (Cl. 117—62.2)

The present invention relates to improved tire textiles, such as chafer and flipper strips, and tubeless tire constructions containing the same.

There are several instances in the preparation of tubeless tires where it may be desirable to use synthetic multifilament hydrophobic yarns comprising nylon, polyethylene terephthalate (e.g. Dacron) or the like. For example, a conventional tubeless tire constructions employ a carcass of rubber with so-called tire cords embedded therein for reinforcing purposes. These cords may advantageously comprise multifilament nylon or similar hydrophobic synthetic yarn. Additionally, in tubeless tire constructions, the rubber carcass is provided with wheel rim-engaging portions or beads which are reinforced by circumferentially extending cores of wire or other relatively rigid material. These wire cores are covered by woven or nonwoven strips of fabric known in the art as flipper strips. These strips, which may also be made of multifilament nylon, polyester or other similar hydrophobic synthetic yarn extend upwardly into the side walls of the tire to stiffen the latter. Another use of woven or nonwoven fabric comprising nylon or the like is in chafing (or finishing) strips which are positioned over the exterior of the tire carcass in the regions of the beads to resist abrasion of the tire by the wheel rim flanges on which the tire is mounted.

As is well known in the art, one of the major considerations in preparing textile materials for use in tubeless tire construction, especially in the case of chafing and flipper strips, is the requirement that the textile be made air-impermeable in order to prevent the escape of air from the tire. Typical prior efforts involving the use of multifilament yarn in the preparation of air-impermeable chafer or flipper strips are shown in U.S. Patents 2,902,073 and 3,028,902.

While it is essential to obtain air-impermeability, it is also important that the tire textile demonstrates effective adhesion to the natural or synthetic rubber components used in the tire constructions. However, despite all of the prior efforts to make air-impervious tire yarns or fabrics from multifilament nylon or similar synthetic hydrophobic thermoplastic textile material, there are still many problems in obtaining both optimum adhesion and air-impermeability and it has been difficult, if not impossible, to consistently obtain products which are completely air-impermeable and at the same time demonstrate proper adhesion to the rubber tire components. This is particularly true in the case of nylon chafer fabric for use in the manufacture of aircraft and other heavy duty types of tires where the high air pressure in the tire places severe demands on the fabric from the standpoint of adhesion and air leakage. However, the problems with respect to air-impermeability and adhesion are in no sense limited to this heavy duty type of nylon chafer fabric.

Figure 2:
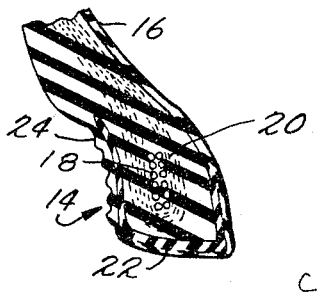

Under the circumstances mentioned above, the principal object of the present invention is to provide certain improvements in preparing air-impervious tire textiles such as flipper or chafer fabric, from multifilament nylon yarn or similar synthetic hydrophobic material, whereby prior art disadvantages are obviated. Other objects will also be apparent with reference to the following detailed description of the invention and the accompanying drawings wherein:

FIGURE 1 is a fragmentary perspective view partially in section of a tire showing the use of tire textiles which may be treated according to the invention; and FIGURE 2 is an enlarged fragmentary sectional view of said tire.

Referring more specifically to the drawings, FIGURE 1 shows a tubeless tire 2 which includes a tread portion 4 surrounding an annular inner carcass 6 of resilient elastomeric material, such as natural or synthetic rubber, and reinforcing cords, the latter being disposed in superposed plies 10. These cords 10 may comprise multifilament nylon yarn or the equivalent and it is well known to finish such yarn with a latex composition, usually a resorcinol-formaldehyde/latex, to improve adhesion to the rubber carcass or rubber tire components. The present invention contemplates the treatment of nylon yarn or the like for use as tire cord, as well as textile fabric to be used as chafer or flipper strips, to improve the working characteristics thereof in tire construction.

The inner periphery of the tire is defined by spaced bead portions 12 and 14. These bead portions are intended to fit on the rim of a vehicle wheel and cooperate therewith to provide the desired air chamber. The interior of the tire carcass is usually provided with a layer or lining 16 of an impervious elastomeric material such as the isoolefin-diolefin copolymer commonly known as butyl rubber. The bead regions 12 and 14 are identical and are formed by turning the edges of the cord plies 10 successively about a circumferentially-extending bead core 18, which may be formed by a bundle of wires suitably wrapped and provided with the flipper strip 20, the ends of which extend radially of the side wall of the tire. Extending externally over the turned ends or edges of the reinforcing cord plies 10 in each bead is the chafer or finishing strip 22. The strip 22 is relatively narrow and extends transversely of the tire beads with the inner edge of each such strip positioned within the interior of the tire carcass just above the bead toe. The strips extend across the bead bases and radially of the side walls a short distance to positions therein above the outer edges of the tire rim on which the tire is adapted to be mounted. The chafer strips 22 are usually, but not necessarily, calendared or otherwise laminated with unvulcanized elastomeric material on both sides so that during curing of the tire they bond to the inner layer or liner 16 and the outer covering or side wall rubber 24.

As indicated heretofore, the flipper and chafer strips 20 and 22, respectively, must be air-impervious due to the fact that, in tubeless tires, air pressure in the tire cavity forces air against and under the tire bead and if the chafer fabric, for example, is not impervious to the passage of air, each individual fiber will serve as a pipe to conduct air out of the cavity into the body of the tire or to the outside atmosphere thereby causing the tire to deflate. In view of this, it is well known practice to impregnate the woven or nonwoven fabric which is to be used in making these chafer and flipper strips, with a composition containing resorcinol-formaldehyde and a rubber latex. The fabric impregnation with this latex composition (which is referred to herein as a finishing composition, for convenience) may be repeated one or more times, as desired, followed each time by drying.

The above described treatment of the fabric is intended to render the same both air-impervious and suitably adherent to the rubber carcass or rubber tire components. However, consistently satisfactory products are not attainable, especially when working with textile material which may be used with heavy duty tires, e.g. fabric woven from 720–840 denier, 140 filament nylon yarn having some twist therein (typically 7 turns). These heavy duty tires require high adhesion and complete air-impermeability at relatively high pressures (e.g. 150–300 p.s.i.) and prior processing conditions using, for example, resorcinol-formaldehyde/latex compositions to finish the fabric, have not been adequate. The problem with prior procedures apparently results from the drying operation which follows impregnation of the fabric with the resorcinol-formaldehyde/latex or finishing composition. Examination of cross-sections of yarn removed from fabrics woven with multifilament nylon and treated with aqueous resorcinol-formaldehyde/latex, e.g. resorcinol - formaldehyde/styrene - butadiene - vinylpyridine terpolymer latex or mixtures of this terpolymer with styrene-butadiene copolymer latex, shows that the fiber bundles are well impregnated with the aqueous resorcinol-formaldehyde/latex composition before drying. However, in the subsequent drying process to remove water, there is substantial migration of the resorcinol-formaldehyde/latex to the surface of the yarns, thereby piling up a shell of finish on the outside of the yarn bundle and leaving the center of the yarn bundle with little or no finish. This decreased amount of finish in the interior of the yarn, i.e. in the spaces between the individual filaments, it not sufficient to block the passage of air at high pressure along the longitudinal axis of the yarn and in consequence the fabric leaks and is unsatisfactory for the above described uses in tire construction.

It would appear from the above that the problem of air-wicking or air-leakage might be obviated if the drying operation is carried out in some way which avoids the usual migration of the latex finish. However, various efforts in this direction have not proven satisfactory. For example, drying with infrared as the heat source shows no improvement. It is possible to dry in air under static conditions at room temperature to obtain a non-airwicking (i.e. air-impermeable) fabric but this is impractical for production purposes because of the relatively long time required for the drying to take place (e.g. at least one hour at 75° F.). Drying in an oven with recirculating air at 75° F. will shorten the drying time but this is accompanied by sufficient migration of the finish to cause some air leakage in the resulting product. Drying at higher temperatures (such as 160° F., 190° F. and 250° F.) shows even greater air leakage as the drying temperature is increased.

According to the invention, the prior art problems of finish migration and airwicking in tire textiles comprising multifilament nylon or similar synthetic hydrophobic thermoplastic yarn, can be effectively obviated by a process which involves impregnating the textile material with an aqueous finishing composition comprising a rubber latex with or without resorcinol-formaldehyde; thereafter treating the wet textile with dilute acetic acid or like weak acid which is volatile at the drying temperature and does not significantly degrade the textile material; followed by drying. Surprisingly, the treatment with dilute acid prevents any significant migration of the finishing composition in the drying step so that, regardless of the drying temperature or rate of water removal from the fabric, there are insufficient voids, if any, between the yarn filaments to permit air passage along the yarn axis. The instant that the finishing composition comes in contact with the acid, it is coagulated in situ and consequently rendered incapable of migrating in the drying step. Accordingly, the invention makes it possible to accomplish the drying operation at high speeds and temperatures without the danger of migration and consequential airwicking or permeability. The process also has the further advantage that the acetic acid or the like is readily volatilized during the drying step without undesirably affecting the fabric characteristics so that, if desired, the fabric can be given a second impregnation with the same or different finishing composition. Such second impregnation need not be followed by further acid treatment although this will depend at least to some extent on the nature of the finishing compositions, fabric construction and the solids add-on from the first impregnation.

The acid treatment may be carried out in a variety of ways. For example, the wet fabric or yarn from the initial impregnation with latex finishing composition, after removing excess finishing composition by passing the fabric through a pair of squeeze rolls, may be dipped into a dilute aqueous solution of acetic acid or like volatile acid, and thereafter dried. Preferably, however, to obtain optimum adhesion characteristics as well as air-impermeability, the acid treatment is effected by contacting the wet textile with a liquid spray of dilute acid or vapors thereof. Regardless of the method by which the acid is applied, the finish is effectively coagulated and made incapable of migrating in the drying step. However, the acid spray or vapor method of application is preferred because none of the finish is washed off the textile, as may be the case with a dip or immersion type of acid treatment, and better adhesion potential to rubber is obtained.

As indicated, acetic acid is preferred for the treatment herein because of its volatility and easy and complete removal in the subsequent drying step. Additionally, it does not cause any degradation of either nylon or Dacron and it is relatively cheap and not as corrosive to equipment as mineral acids. Low concentrations of dibasic acids and fatty acids containing up to four carbon atoms could be used on either type of fabric. Weak, volatile mineral acids can be used on Dacron fabrics but cause degradation of nylon fibers. Nonvolatile acids cannot be used because such acid causes coagulation of the resorcinol-formaldehyde latex mixture in subsequent passes of the cloth through it and will be carried on into the finished cloth.

The amount of acid solution used will necessarily vary depending upon other operating factors such as the nature and construction of the textile material undergoing treatment, the amount of solids add-on in the impregnation with the finishing composition, acid concentration, etc. Broadly stated, sufficient aqueous acid is used to coagulate all of the finish or enough to prevent any significant amount of migration. The finishing composition will usually have an alkaline pH and it is generally satisfactory to use sufficient acid to bring the pH of the wet fabric below 7, preferably down to about 5 or even lower. Acid contact time will vary not only with the alkalinity of the wet finish but by the method of application. For example, contact time when dipped into a bath of 5% acetic acid need not be more than one second; when sprayed on, a longer time will be required since not every particle of latex will be contacted by the spray and several seconds are required thereafter for the acid to migrate. Vapor phase treatment requires a higher concentration in boiling water and requires even longer periods of time in the vapor box for complete coagulation to be effected.

The invention herein is applicable with any of the usual types of aqueous latex finishing compositions which present a problem of airwicking when used for preparing tire textiles from multifilament nylon or equivalent hydrophobic yarns. Thus, for example, compositions may be prepared in the manner described in my U.S. Patent 3,030,230 using styrene-butadiene copolymer and/or styrene-butadiene-vinylpyridine terpolymer latices as specifically shown in my copending application Serial No. 70,917, now U.S. Patent No. 3,240,650; and butadiene-acrylonitrile copolymer latex (U.S. Patent 3,030,230 referred to above), the particular latex selected in any specific situation depending upon the nature of the textile material being used. The finishing composition which is used in the initial impregnation or first pass may or may not contain resorcinol-formaldehyde but if it does not, it is generally preferred to give the textile material another pass in a finishing composition which includes resorcinol-formaldehyde in addition to latex, in order to obtain optimum adhesion.

A preferred resorcinol-formaldehyde/latex composition for use herein may be described as aqueous, desirably organic solvent-free, alkaline mixture of partially condensed resorcinol-formaldehyde reaction product (i.e. a resole) and a synthetic rubber latex wherein the ratio of resole to latex solids is within the range of 1:12 to about 1:2.5. This composition may be used for the initial impregnation and/or any subsequent impregnation of the textile material after acid treatment and drying. Preferably, in such resole/latex finishing composition, the latex solids comprise styrene-butadiene-vinylpyridine terpolymer alone or a mixture thereof with styrene-butadiene copolymer (e.g. a 70/30 mixture or the like with a minimum of at least 20% terpolymer for the latex solids). A particularly desirable vinylpyridine-butadiene-styrene terpolymer latex for use herein is that available under the tradename "Gentac" (General Tire). Other equivalent terpolymers for use herein are available as Hycar 2518 (Goodrich), Pyratex B (Naugatuck), Pliolite VP–100 (Goodyear) and Butaprene PL–29 (Firestone Plastics). These terpolymers may comprise, in parts by weight, from 50 to 95 parts butadiene, 5 to 50 parts vinylpyridine and, per 100 parts of butadiene/vinylpyridine, from 5 to 30 parts styrene. Typically suitable terpolymers for use herein are described in Mighton 2,561,215; Cislak et al. 2,402,020 and Wilson 2,652,353.

In another advantageous embodiment of the invention, the first impregnation or pass advantageously comprises a rubber latex which is free from resorcinol-formaldehyde, particularly a styrene-butadiene copolymer rubber latex made from a monomer ratio of from 50/50 to 70/30 parts of butadiene to styrene. However, it will be appreciated that the polymer rubber may be a copolymer or terpolymer comprising some other aromatic substituted vinyl monomer in lieu of styrene, or in addition thereto, e.g. methyl styrene, and the butadiene may be replaced, in whole or in part, by one or more conjugated diolefins such as 1,2-dimethyl butadiene or the like. In this embodiment, the textile is preferably subjected to another pass using resole/terpolymer latex of the type described in the preceding paragraph after the acid treatment and drying.

According to the invention, the aqueous latex may be applied to the fabric in any suitable way, such as by immersion followed by passage through the squeeze rolls, or by padding, followed by the acid treatment of the invention. The solids content of the initial finishing composition and the amount of solids deposited on the textile material will vary widely but, generally speaking, the solids content will fall in the range of 15 to 30% by weight and the wet pickup will range between 75 and 85% based on the weight of the textile prior to treatment. It will be appreciated, however, that the amount of solids add-on and the solids content which may be necessary to give non-air wicking will vary substantially from one situation to another depending on such factors as the nature and construction of the textile materials involved.

The wet textile, after the acid treatment, is dried at any desired rate and temperature. As noted above, high drying rates at high temperatures are possible without airwicking by means of the present invention and it is usually preferred to operate at the highest temperatures which will not harm the textile and yet give the fastest drying times. Conveniently, the drying operation is carried out at temperatures of the order of 200 to 275° F., care being taken to avoid curing until the last finish application. The drying step may be conveniently carried out by circulating hot air until the textile material is substantially dry. This usually takes about 2 to 6 minutes in the indicated temperature range. Curing, if desired, after the last latex finish application may be accomplished by heating the fabric or yarn at, for example, 270° F. for 8 minutes or 330° F. for 4 minutes.

Nylon fabric or the like treated in the manner indicated may be cut into the desired shape and size and used directly in tire construction. In the case of chafer fabric, however, it is generally the practice to calendar a sheet of unvulcanized elastomer on each side of the fabric before it is used to prepare the tire as indicated heretofore. Desirably, the elastomer sheet applied to one side of the fabric is butyl rubber or like material of high fluid imperviousness while the rubber sheet on the other side of the fabric may be natural compounded rubber, GRS or the like. The resulting laminate is cut into strips as desired and used to complete the tire structure, the strips being bonded to the rubber tire carcass during the subsequent heat/pressure molding and vulcanizing.

The air permeability or diffusion characteristics of the fabric or yarn of the invention may be determined using the method and apparatus described in U.S. Patent 3,034,-336. Results showing 0 x 0 permeability, i.e. no airwicking or diffusion in either the warp or filling direction of the fabric, are attainable with the present process.

Any woven or nonwoven fabric and yarns comprising multifilament nylon, polyester or other synthetic hydrophobic thermoplastic textile where wicking is a problem by reason of the rate of drying for water removal, may be effectively treated according to the invention. As typical examples of woven fabric constructions treated herein there may be mentioned the following:

| | Ends/picks per inch | Material |
|---|---|---|
| 1 | 17 x 17 | 840 denier, 56 filaments, 7 turns nylon (Type 6). |
| 2 | 17 x 17 | 840 denier, 140 filaments, 7 turns nylon (Type 66). |
| 3 | 19 x 20 | 840 denier, 140 filaments, 12 turns nylon (Type 66). |
| 4 | 24 x 26 | 720 denier, 140 filaments, 7 turns Nylon (Type 330). |
| 5 | 15 x 16 | 2 ply 420 denier, 68 filaments 17½ Z/15S nylon (Type 66). |
| 6 | 22 x 23 | 900 denier 9 filaments 3Z nylon (Type 66). |
| 7 | 22 x 23 | Filling. 720 denier; warp, 900, denier; 9 filaments 3Z nylon (Type 66). |

The invention is illustrated but not limited by the ensuing examples wherein parts and percentages unless otherwise stated are by weight. For convenience, the following abbreviations are used in these examples:

RFL—resorcinol formaldehyde/terpolymer latex made as described below.

SBR—styrene-butadiene copolymer latex known as Naugatex J–9049 wherein the copolymer comprises about 46% bound styrene and 49% butadiene.

The RFL composition used in the following examples was prepared using Parts A and B as indicated:

PART A

| | |
|---|---|
| Resorcinol | 5.1 |
| 37% formaldehyde | 6.5 |
| NaOH flakes | 0.23 |
| Water | 110 |
| (6.25% resin solution) | [1] 122 |

[1] Approximately.

PART B

| | Wet Basis, parts | Dry Basis, parts |
|---|---|---|
| 6.25% Resin Solution (Part A) | 19.6 | 1.23 |
| 41% Gentac Latex | 26.0 | 10.66 |
| 10% Triton X-100 solution | 1.26 | 0.126 |
| Water to give indicated solids content | | |
| Total | 46.86 | 12.016 |

PREPARATION OF PART A

90% of the water for Part A was measured into the resin preparation tank. The caustic soda flakes were added and the mixture stirred until the caustic was dissolved. The resorcinol was then added and dissolved by stirring. The formaldehyde and balance of the water were then added, the temperature of the water having been previously adjusted to 80° F. The resulting mixture was aged for 6 hours under controlled temperature conditions of 80–84° F. At the end of the 6 hours, the resulting resole resin solution (Part A) was used in the preparation of the composition (Part B).

PREPARATION OF PART B

The Gentac latex was measured into a mixing tank with stirring. The Triton solution was added and the water and resin solution (Part A) were then slowly added. The resulting composition is ready for immediate use but may be stored for a limited time (about 3 days) at room temperature, or, for prolonged periods of time under refrigeration.

The RFL composition used herein may also be prepared by repeating the process outlined above except that Part A is made up in two separate stages. First, a so-called "arrested resin solution" is prepared using the following proportions:

| | Parts |
|---|---|
| Resorcinol | 5.1 |
| NaOH flakes | .3 |
| 37% formaldehyde | 2.15 |
| Water | 4.9 |
| Total | 12.45 |

This arrested solution may be made by first adding the water to a suitable tank or drum. The NaOH flakes are then added and dissolved by stirring followed by addition and dissolution of the resorcinol. Thereafter, the formaldehyde is added, considerable heat being generated. The tank is cooled to prevent boiling and, after allowing the contents to cool, the resulting composition is stored in stainless steel or lined drums sealed to prevent entrance of air. This composition may be stored for an indefinite period of time as compared to not more than about 20 hours for the Part A composition referred to above.

In preparing an RFL composition using "arrested resin" solution, it is first necessary to complete the preparation of the resole resin solution. To 12.45 parts of "arrested resin" solution, 4.3 parts of 37% formaldehyde in the remaining parts of water are mixed together, aged for from 1–6 hours at 80–84° F., at which time the resin solution is ready to be used in the preparation of the RFL.

*Example 1*

Woven nylon fabric made of 1140 ends of 840 denier, 140 filament nylon yarn with 7 turns Z twist (17 ends and 17 picks per inch) was immersed for 7 seconds in aqueous RFL composition containing 14% solids prepared in the manner discussed above. After passing through squeeze rolls to remove excess RFL composition, the fabric was passed through an aqueous solution containing 1% acetic acid at room temperature. This treatment took about 3 seconds. The fabric was then dried in an oven with high velocity air at 250° F. for 2 minutes. The treatment with RFL composition was repeated, after which the fabric was again dried at 250° F. and then cured at 330° F. for about 4 minutes. The dry solids add-on amounted to 10.8% and 20.4%, respectively, after the first and second RFL treatments, based on the original weight of the fabric.

A three ply peel adhesion test section was prepared by sandwiching a layer of 40 mil compounded, uncured rubber stock between two layers of the fabric and this assembly was cured under normal curing conditions for this stock of 30–45 minutes at 290° F., and a pressure of at least 120 p.s.i. based on the area of the rubber layer. The peel adhesion between the fabric and rubber amounted to 36.5–43 pounds per inch of width using a 2 inch width test section and a jaw separation speed of 2 inches per minute.

Test sections for air diffusion testing were tested in the manner shown in U.S. patent 3,034,336 and demonstrated 0 x 0 air permeability at 300 p.s.i., i.e. they were completely air-impermeable or non-airwicking.

The same test procedures for air diffusion and adhesion were used in all of the following examples.

*Example 2*

The significance of the acid treatment used in Example 1 is shown by the fact that when said example was repeated with the omission of the acetic acid dip, the fabric leaked badly and was unsatisfactory for use in tubeless tire contsruction using RFL compositions containing both 14% and 18% solids. Somewhat less leakage was obtained when a drying temperature of 160° F. was used but the leakage was still sufficient to destroy the effectiveness of the fabric for use as a chafer or the like in tubeless tire construction. Without the acid treatment, it was found possible to obtain no air leakage only by drying at room temperature but this took at least 50 minutes and was, therefore, unacceptable from a production standpoint.

*Example 3*

Example 1 was repeated except that a drying temperature of 160° F. was used, the drying operation being completed in 3 minutes. The resulting product showed 0 x 0 air permeability and an adhesion to rubber of 35–36.5 pounds per inch and was satisfactory for use as a tire fabric.

*Example 4*

Example 1 was repeated except that, after the second RFL pass and before curing, the wet fabric was given another dip in 1% aqueous acetic acid at room temperature. The resulting product showed 0 x 0 air permeability and an adhesion of 36–38 pounds per inch.

The process was repeated using a lower drying temperature (160° F.) for 3 minutes to give a product which was non-airwicking with adhesion of 30–33 pounds per inch to tire stock.

*Example 5*

The process of Example 1 was repeated using an RFL composition containing 18% solids. The resulting product was non-airwicking with an adhesion to rubber of 50–55 pounds per inch. Using a lower drying temperature of 160° F., the adhesion was reduced to 40–42.5 pounds with no airwicking.

*Example 6*

The process of Example 5 was repeated using the 160° F. drying temperature with the exception that, after the second RFL pass and before curing, the fabric was given a second dip in 1% acetic acid. The product was non-airwicking and showed an adhesion of 55–56 pounds per inch.

*Example 7*

The process of Example 1 was repeated except that the RFL composition included 18% total solids, the acid solution was only 0.25% acetic acid and the dip was applied to the wet fabric after both RFL passes. The finished product was air-impermeable and showed an adhesion of 32.5–36.5 pounds per inch.

Other examples using the fabric of Example 1 to prepare a non-airwicking product suitable for use in tire construction are set forth below:

*Example 8*

*Conditions.*—Three passes with 14% RFL, dip in 5% acetic acid after each pass, dry at 250° F. after each dip and cure at 330° F. after last dry. Solids add-on 10.8%, 20.4%, 27.4%, respectively, after each dry.

*Results.*—Non-airwicking and adhesion of 34–40 pounds per inch.

*Example 9*

*Conditions.*—Two passes with 18% RFL, dip in 0.5% acetic acid after the first pass only, dry at 250° F. after each pass and cure at 330° F. after the last dry.

*Results.*—Non-airwicking, adhesion of 33–36 pounds per inch.

*Example 10*

*Conditions.*—First pass in SBR latex (20% solids), followed by spray with 0.5% acetic acid at room temperature for about 5 seconds, drying at 250° F. a second pass in the RFL composition (14% solids) followed by drying at 250° F. and curing at 330° F.

*Results.*—Non-airwicking; adhesion 37–41.5 pounds per inch.

*Example 11*

*Conditions.*—As in Example 10 but coagulating the first pass SBR latex by the acid vapors from acetic acid in water at the boil.

*Results.*—Non-airwicking with adhesion of 45–49 pounds per inch.

*Example 12*

*Conditions.*—Two passes of RFL composition (14% solids) with application of acid vapor as in Example 11 after first pass, drying at 250° F. and curing at 330° F.

*Results.*—Non-airwicking, adhesion 48–50.5 pounds per inch.

*Example 13*

*Conditions.*—As in Example 12 except using RFL compositions containing 12% solids.

*Results.*—Non-airwicking, adhesion 32–35 pounds per inch.

*Example 14*

*Conditions.*—One pass with the SBR latex (18% solids), followed by acetic acid vapor treatment of the wet fabric as in Example 11, drying at 250° F., another pass in RFL composition (18% solids,) followed by drying at 250° F., curing at 330° F.

*Results.*—Non-airwicking, adhesion 48–50 pounds per inch.

*Example 15*

*Conditions.*—First pass in the SBR latex (16% solids) followed by spray of 15% acetic acide at room temperature, drying at 150° F., and a second and third pass in RFL composition (16% solids), drying after each pass at 150° F., and curing after the last drying for 4 minutes at 330° F.

*Results.*—Non-airwicking; adhesion 46 pounds per inch.

The following examples involve the treatment of woven fabric comprising 720 denier, 140 filament nylon yarn having 7 turns of Z twist per inch, in both warp and filling (24 warp ends and 26 filling picks per inch) to prepare a non-airwicking product suitable for use as a tire chafer or flipper:

*Example 16*

*Conditions.*—First pass with SBR latex (20% solids), followed by dip in 3% acetic acid solution at room temperature (70–75° F.), drying at 200° F., second pass with RFL composition (16% solids), followed by drying at 200° F., another pass with the RFL composition and again drying at 200° F. and curing at 330° F.

*Results.*—Non-airwicking; adhesion 66 pounds per inch.

The example was repeated except that, in the last pass, a part of the terpolymer was replaced by styrenebutadiene copolymer rubber (50% styrene and 50% butadiene) so that the rubber content in this pass was 70% terpolymer and 30% styrene-butadiene copolymer. The resulting product was non-airwicking under 300 p.s.i. pressure with a somewhat lower adhesion of 53 pounds per inch to compounded rubber stock. Essentially equivalent results were obtained by omitting the third latex pass and using an RFL composition of higher solids content (e.g. 25%) for the second pass. As another alternative, the RFL composition with this higher solids content could be modified by replacing a part of the terpolymer with styrene-butadiene copolymer to give a 70/30 mix as before.

*Example 17*

*Conditions.*—First pass with 14% solids RFL composition, followed by a 1% acetic acid dip, drying at 220° F., a second pass in 14% RFL followed by drying at 220° F. and curing at 330° F.

*Results.*—Non-airwicking; adhesion 33–37.5 pounds per inch.

It will be appreciated from the foregoing examples that various modifications may be made herein without deviating from the invention as defined in the following claims wherein I claim:

1. A process for preparing an air-impervious tire fabric which comprises impregnating a fabric composed of synthetic multifilament hydrophobic yarn with a latex composition, then treating said fabric with dilute volatile acid which will not degrade the fabric whereby said latex is coagulated in situ, drying said fabric, then impregnating said fabric with a resole/latex composition and again drying.

2. The process of claim 1, wherein said first latex composition consists essentially of styrene butadiene polymer latex.

3. The process of claim 1 wherein said first latex composition comprises styrene-butadiene copolymer latex and resorcinol-formaldehyde.

4. The process of claim 1 wherein the acid treatment is carried out by immersing the fabric in dilute acetic acid solution.

5. The process of claim 1 wherein the acid treatment is carried out by contacting the fabric with vaporized dilute acetic acid.

6. A process for preparing an air-impervious tire fabric which comprises impregnating a fabric made of multifilament nylon yarn with an aqueous, organic solvent-free, alkaline mixture of partially condensed resorcinol-formaldehyde and a synthetic rubber latex wherein the ratio of resorcinol-formaldehyde to latex solids is within the range of 1:12 to about 1:2.5, then treating said fabric with dilute acetic acid until the pH of said fabric is below 7 whereby said latex is coagulated, then drying said fabric without curing, again impregnating said fabric with said aqueous, organic solvent-free, alkaline mixture and again drying said fabric.

7. The process of claim 6 wherein the synthetic rubber latex comprises a sytrene-butadiene-vinylpyridine terpolymer latex.

8. The process of claim 7 wherein the fabric is woven, and the drying is carried out at a temperature of 200–275° F. without curing.

9. A process for preparing an air-impervious tire fabric which comprises impregnating a fabric made of multifilament synthetic hydrophobic yarn with an aqueous alkaline composition including a synthetic rubber latex, then contacting said impregnated fabric with a weak acid which does not degrade the fabric but coagulates said latex, then drying said fabric without curing, then impregnating said fabric with an aqueous alkaline mixture of partially condensed resorcinol-formaldehyde and synthetic rubber latex wherein the ratio of resorcinol-formaldehyde to latex solids is between 1:12 and about 1:2.5, and again drying said fabric.

10. The process of claim 9 wherein said acid is vaporized acetic acid, said yarn comprises nylon, said alkaline composition consisting essentially of a styrene-butadiene latex and the synthetic rubber latex in said alkaline mixture comprises styrene-butadiene-vinylpyridine terpolymer latex.

11. The process of claim 10 wherein said alkaline mixture includes some styrene-butadiene copolymer latex, the terpolymer comprising at least 20% of the latex solids.

12. A tire fabric for use in the bead portion of a tire and which is strongly bondable thereto, said fabric comprising multifilament synthetic hydrophobic yarns blocked against the passage of air under pressure along the longitudinal axes of the yarns by means of a dried latex coagulated in situ, said blocked yarns being coated with a resorcinol-formaldehyde/latex composition.

References Cited by the Examiner

UNITED STATES PATENTS

| | | | |
|---|---|---|---|
| 2,018,508 | 10/1935 | Barnard | 117—62.1 X |
| 2,337,390 | 12/1943 | Hinkamp et al. | 117—62.2 |
| 2,526,431 | 10/1950 | Strickhouser | 117—62.2 X |
| 2,902,073 | 9/1959 | Lessig | 152—362 |
| 3,028,902 | 4/1962 | Formanek | 152—362 |
| 3,030,230 | 4/1962 | Atwell | 117—76 |

WILLIAM D. MARTIN, *Primary Examiner.*

R. HUSACK, *Assistant Examiner.*